Feb. 2, 1932.                M. E. BURNETT                1,843,864
                        BIRD SEED BISCUIT HOLDER
                           Filed Aug. 6, 1930
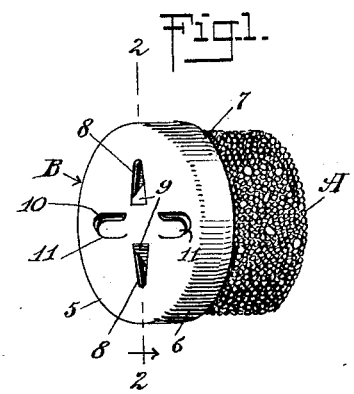
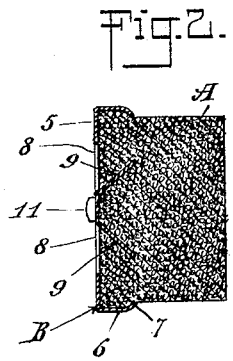
WITNESSES
INVENTOR
*Mabel E. Burnett*
BY
ATTORNEYS Patented Feb. 2, 1932

1,843,864

UNITED STATES PATENT OFFICE

MABEL E. BURNETT, OF NEWARK, NEW JERSEY, ASSIGNOR TO BURNETT'S, INC., OF NEWARK, NEW JERSEY, A CORPORATION OF NEW JERSEY

BIRD SEED BISCUIT HOLDER

Application filed August 6, 1930. Serial No. 473,452.

This invention relates to a holder or base for a bird seed biscuit, to afford means by which the biscuit may be attached to the bars of a bird cage, and comprehends an improved means on the base or holder which prevents relative rotation of the biscuit with respect to the base.

Bird seed biscuits, which are made up of a mixture of bird seed adhesively joined together and molded in a plastic form, have heretofore been supported by a cup shaped base having an undercut marginal flange into which the enlarged end of the biscuit extends. In practice, however, it has been found that after the biscuit has dried, there is a tendency of the same to rotate relative to the holder or base, due to a slight shrinkage of the biscuit.

It is, therefore, the object of the present invention to provide means on the holder or base, which extends into the biscuit, which functions to anchor the biscuit against rotation with respect to said holder or base.

The invention further aims to provide an improved bird seed biscuit holder which does not complicate the structure or increase the expense of production and which materially adds to the efficiency of the product.

With the above recited and other objects in view, reference is had to the following description and accompanying drawings, in which there is exhibited one example or embodiment of the invention, while the claim defines the actual scope of the same.

In the drawings:

Figure 1 is a perspective view of a bird seed biscuit and holder constructed in accordance with the invention.

Figure 2 is an axial sectional view therethrough taken approximately on the line indicated at 2—2 in Figure 1.

Referring to the drawings by characters of reference, A designates the bird seed biscuit, and B the holder or base, which includes a circular wall 5 having a marginal annular flange 6, the free edge 7 of which is directed inwardly to provide an annular pocket within which an annularly enlarged portion of the biscuit A is received, to prevent axial separation of the base or holder B and biscuit A. In practice, the biscuit in a semi-plastic form is forced against the base so that the enlarged annular portion forms itself within the flange 6. As previously explained, after the plastic biscuit has dried out, a slight shrinkage thereof allows for relative turning movement of the biscuit with respect to the base, which is undesirable. In order to overcome this without increasing the expense of production of the product, the wall 5 of the base B is slitted as at 8 to provide a pair of angularly disposed inwardly projecting fingers 9 which are embedded in the biscuit at the time the same is in its plastic form and being applied to the base. The fingers 9 function to prevent relative rotation of the biscuit and base, and in addition augment the establishment of a connection between the biscuit and base against axial separation thereof. The wall 5 is further provided with the usual slitted portions 10 which define the oppositely directed diametrically disposed attaching tongues 11 which afford means for connecting the base or holder with the bars of a bird cage.

What is claimed is:

The combination with a bird seed biscuit, of a cup shaped holder including means formed on the end wall of the holder and extending into the inner end of and embedded within the biscuit for preventing relative rotation of the holder and biscuit, said means consisting of slitted portions struck up from the holder to provide fingers projecting inwardly at an angle therefrom and diverging with respect to each other.

MABEL E. BURNETT.